United States Patent [19]

Pernet

[11] Patent Number: 5,051,566
[45] Date of Patent: Sep. 24, 1991

[54] IC CARD READER

[75] Inventor: Michel Pernet, Doubs, France

[73] Assignee: Alcatel Cit, Paris, France

[21] Appl. No.: 452,437

[22] Filed: Dec. 19, 1989

[30] Foreign Application Priority Data

Dec. 20, 1988 [FR] France .................. 88 16819

[51] Int. Cl.[5] ........................................... G06K 07/06
[52] U.S. Cl. .................................... 235/441; 235/475; 235/479
[58] Field of Search ............... 235/441, 379, 380, 486, 235/492, 479, 475

[56] References Cited

U.S. PATENT DOCUMENTS 4,236,667 12/1980 Crowley et al. ............... 431/250 X
4,814,593 3/1989 Reichardt et al. ............. 235/486 X
4,859,199 8/1989 Komatsu ......................... 438/267

FOREIGN PATENT DOCUMENTS 0263746 4/1988 European Pat. Off. .
0274534 7/1988 European Pat. Off. .
2505523 11/1982 France .
2599530 12/1987 France .

Primary Examiner—Stuart S. Levy
Assistant Examiner—Steven M. duBois
Attorney, Agent, or Firm—Sughrue, Mion, Zinn Macpeak & Seas

[57] ABSTRACT

The IC card reader includes card positioning and guide means and contact elements which provide electrical connections with conducting areas on the IC card, via which circuits are established with the apparatus in which the IC card reader is incorporated. The card reader includes, in particular, a carriage (8) which is moveable relative to a contact frame (3), having a rest position that it occupies when there is no card in the reader, being urged into its rest position by return means (RA), and an actuated position into which it is thrust by a card (100) inserted in the reader. The carriage (8) is arranged to co-operate with the contact elements (35, 36) in such a manner that when in its rest position, the carriage (8) causes the contact elements (35, 36) to be held in a rest position in which they lie off the insertion path (62) of a card, and when in its actuated position, the carriage (8) causes the contact elements (35, 36) to bear against the contact positions of the card.

11 Claims, 4 Drawing Sheets

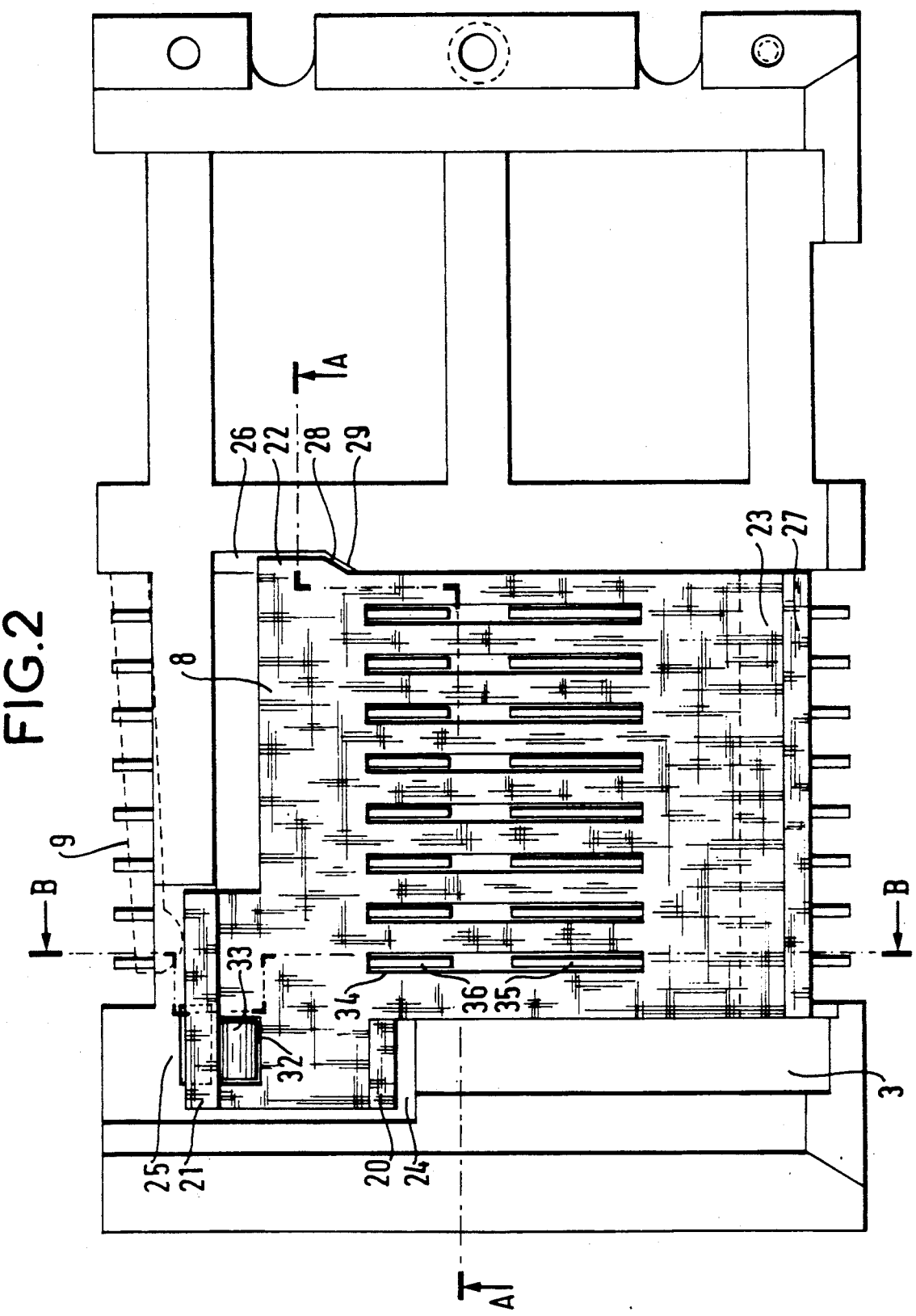

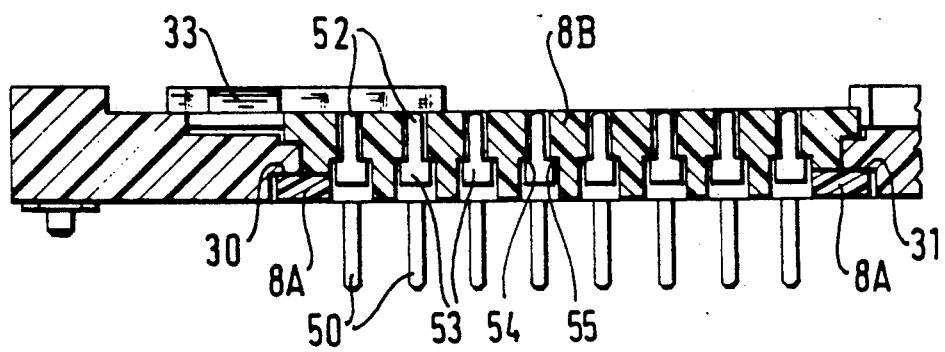
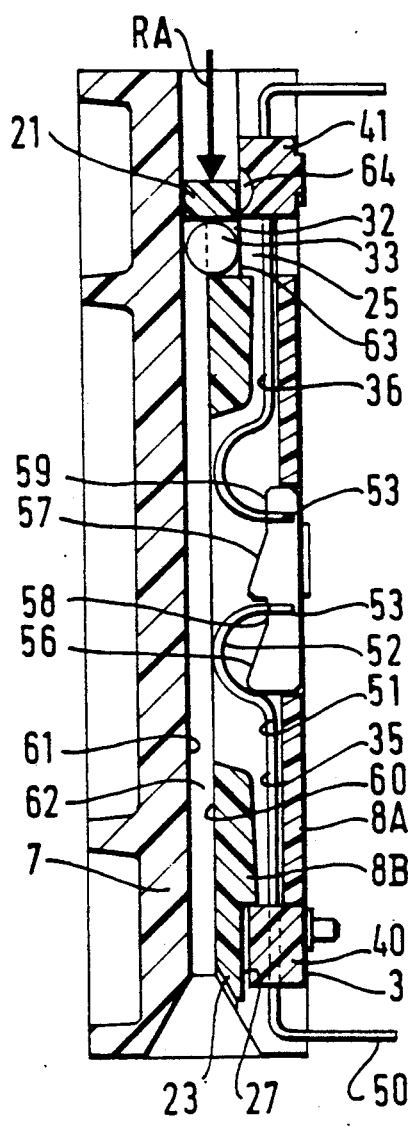
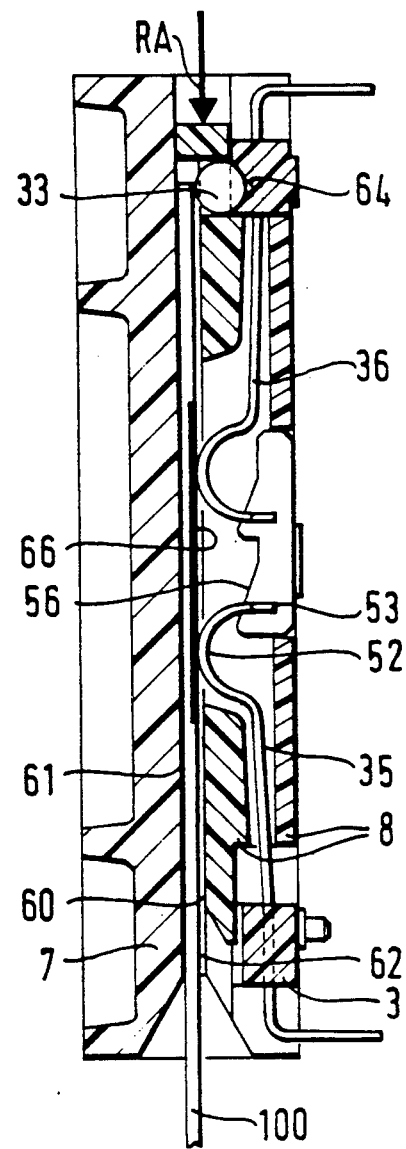

IC CARD READER

The present invention relates to IC card readers, and more particularly to such an IC card reader provided with mechanical means for establishing pressure between a card inserted in the reader and reading contacts.

French patent application number 8715739, filed Nov. 13, 1987 by the Applicant company, describes IC card readers in general and an IC card contact frame in particular. It is specified therein that such a reader includes means for guiding or positioning a card, and optionally includes means for verifying that a card is indeed present in the reader in a suitable position for being read, together with contact elements that provide electrical connection with conducting tabs on the IC card, whereby circuits are established with the apparatus in which the IC card reader is incorporated. The contact frame is a unit component performing the specified functions. Given manufacturing tolerances, it serves to ensure that the contact elements always bend sufficiently when an IC card is inserted to ensure that the required contact pressure is obtained.

Such a design suffers from the drawback that the contact elements apply the contact pressure as described as soon as the card is inserted and before the card is in the reading position. As a result, there appears a uselessly high level of friction between these contact elements and the card, giving rise to excessive wear. Because of this state of affairs, the looked-for contact pressure is the lowest pressure that still gives satisfactory performance with respect to electrical contact. Further, as mentioned in this prior application, the pressure of the contact elements also serve to hold the card in the reader, for example against the return force of an end-of-stroke contact. Insofar as said contact pressure is limited, it follows that the contact pressure of the end-of-stroke contact is equally limited.

These various considerations lead to it being desirable for contact pressure between the contact elements of the IC card reader and the contact tabs of the IC card to be established, at least in part, by mechanical means which art once the card is substantially in the reading position to establish circuits with the IC card.

Patent document EP-A-0 274 534 describes an IC card reader which achieves this result in that it includes a moving carriage which occupies a rest position under the influence of return means when there is no card in the reader, and an actuated position in which it is thrust against a card inserted in the reader, said carriage being arranged to co-operate with the contact elements in such a manner that when it is in the rest position, the carriage causes the contact elements to be held in a rest situation in which they lie off the insertion path of a card, and when it is in the actuated position, the carriage causes said contact elements to bear against the contact positions of the card.

The card for which this reader is provided has contacts disposed in a row along the leading edge of the card, i.e. the edge which is the first to be inserted into the reader. The contact elements are therefore disposed at the far end of the reader and resilient blades extend from a support in the card insertion direction. According to this prior document, the contact elements are extended beyond the contact portion by an actuator arm terminated by an actuator cam. The carriage acts on said actuator cam to hold the contact elements in the rest situation, and then, when a card is inserted, to cause them to bear against the contact positions of the card.

Such a disposition is obviously not suitable for IC cards in which the conducting tabs are disposed in two rows both of which are at a distance from the leading edge of the card.

Patent document EP-A-0 263 746 relates to a card reader of a similar description and calls for the same remarks as the document EP-A-0 274 534.

The object of the present invention is to provide an IC card reader including a carriage arranged to co-operate with contact elements capable of being disposed at a distance from the leading edge of the card and in at least two rows.

The card reader of the invention is characterized in that said carriage includes a ramp co-operating with a shoulder provided close to the end of each contact element, said ramp being formed in the substance of a flank in a slot in the carriage in which the contact element is disposed.

According to another characteristic of the invention, the mode of co-operation between the carriage and the contact elements is such that, when in the rest position, the carriage raises the contact elements against their own return force and thus holds them off the insertion path of a card, and when in the actuated position, with a card being inserted in the reader, the carriage releases the contact elements which thus bear against the contact positions of the card under the effect of their own return force.

According to another characteristic of the invention, each contact element includes two shoulders and the carriage includes two ramps co-operating with respective ones of these shoulders and disposed on either side of the longitudinal axis of the contact element.

According to another characteristic of the invention, the two shoulders are obtained by imparting a T-shape to the free end of the contact element.

According to another characteristic of the invention, the carriage is held by the contact frame by having co-operating shapes, in such a manner as to be displaced from one of said positions to the other by sliding.

According to another characteristic of the invention, the carriage is constituted by two portions so as to facilitate assembling the contact frame and the carriage.

According to another characteristic of the invention, the contact frame or some other portion of the reader includes a resilient finger serving as carriage return means and disposed for this purpose in such a manner as to urge the carriage towards its rest position.

According to another characteristic of the invention, the carriage includes a hollow in which a driving part is received, which part bears on one side against a bearing surface of the contact frame and projects, on the other side, into the insertion path of a card, such that an inserted card encounters the driving part shortly before reaching the end of its insertion stroke, thereby driving the carriage via the driving part so as to move the carriage from its rest position to its actuated position.

According to another characteristic of the invention, said driving part is circularly symmetrical, having its axis of symmetry extending substantially perpendicularly to the card insertion direction.

According to another characteristic of the invention, the driving part is a cylindrical wheel.

According to another characteristic of the invention, said bearing surface includes a housing corresponding to said actuated position and intended to receive a portion of the driving part, said portion being sufficient to enable the driving part to cease to project into the insertion path of a card, whereby the card, as it continues its insertion stroke to a final position in which it encounters an abutment, maintains the driving part in said housing and consequently maintains the carriage in its actuated position, while friction between the contact elements and the contact positions on the card serves to clean the contacts.

Various objects and characteristics of the invention are described in greater detail in the following description provided by way of non-limiting example and made with reference to the accompanying drawings, in which:

FIGS. 1a, 1b, and 1c are respectively a plan view, an end view, and an underside view of a card reader in accordance with the present invention;

FIG. 2 is an underside view of the contact frame of the FIG. 1 reader, including the contact element actuating carriage;

FIG. 3 is a fragmentary section on line A—A of FIG. 2;

FIGS. 4 and 5 are two fragmentary sections on line B—B of FIG. 2 showing the reader with its carriage in the rest position and in the actuated position respectively.

Figure 1C:
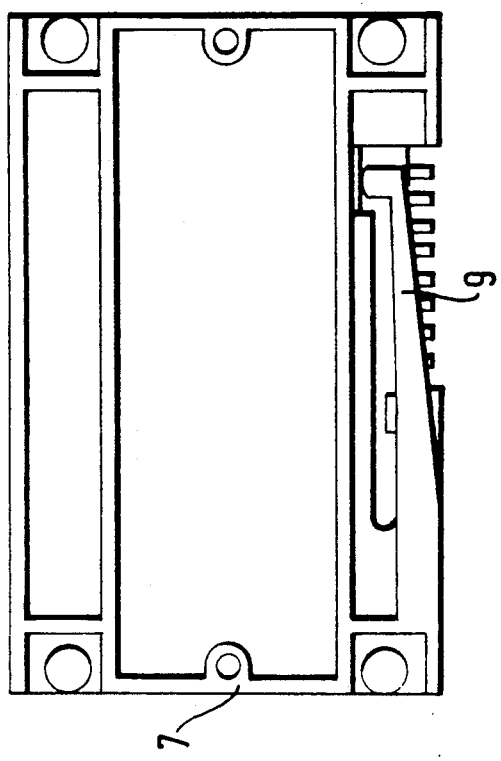
Figure 1A:
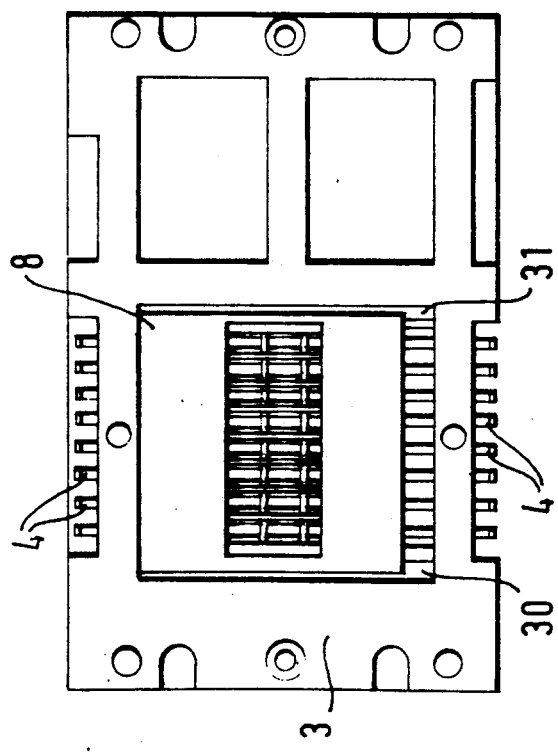
Figure 1B:
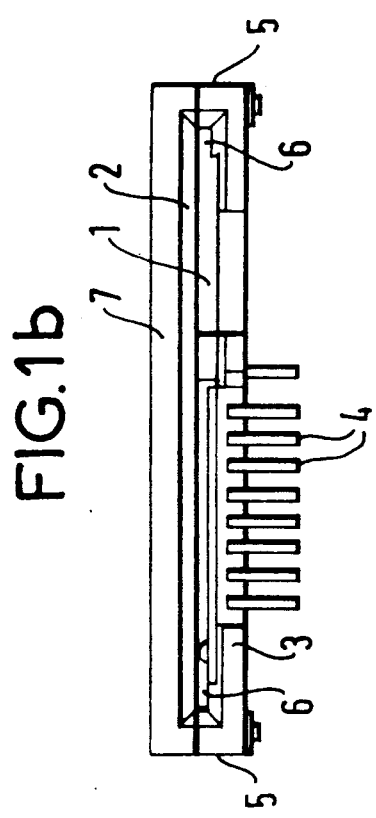

An embodiment of a reader in accordance with the present invention is illustrated initially in FIGS. 1a to 1c. It can be seen that it constitutes a unitary assembly including a card insertion slot 1 with some of its edges 2 being chamfered in order to guide a card towards the inside of the reader. The reader provides all of the electrical and mechanical functions required for reading an IC card.

It essentially comprises a contact frame 3 carrying contact elements which are shaped sections of thin strip held by being overmolded in the substance of the frame 3. The sides 5 of the frame 3 contribute to forming slideways 6 constituting lateral guide means for the card up to its position for IC reading. The frame 3 is associated with a cover 7 which is fixed by any appropriate means to the bottom portion of the frame 3.

The contact frame 3 carries a carriage 8 whose function is to actuate the contact elements as described below. In FIG. 1a, the carriage is shown in its rest position, i.e. its position corresponding to no cards inserted in the reader. It is urged into this position by a resilient lever 9 which is likewise shown in its rest position in FIG. 1c. The description below shows, that at the end of its stroke, a card inserted into the reader via the insertion slot 1 pushes the carriage 8 against the return force provided by the spring 9.

For numerous details in the constitution of the frame 3 and of the cover 7, reference may advantageously be made to the patent application mentioned in the beginning of the present specification.

FIG. 2 is on a larger scale than FIG. 1 and shows the contact frame 3 of FIG. 1a seen from below, with the cover 7 being removed so as to show the carriage 8, likewise as seen from below. The carriage is shaded so as to distinguish it more clearly relative to the various portions of the frame 3. It can thus be seen that the carriage bears at 20, 21, 22, and 23 against corresponding portions 24, 25, 26, and 27 of the frame 3, over which it is capable of sliding. The portion 22 of the carriage 8 constitutes a lug 28 received in a recess 29 of corresponding shape in the frame 3. These two portions have faces 28 and 29 which bear against each other and stop the carriage 8 in its rest position. In addition it can also be seen in FIG. 1a that the carriage 8 bears against carriage slideways 30 and 31 of the frame 3. The carriage 8 is thus positively guided over the frame 3 against which it bears via two sides, thereby holding it in place while allowing it to slide linearly between a rest position as shown in FIG. 2 and an actuated position described below, in which it actuates the contact elements.

FIG. 2 also shows a hollow 32 containing a wheel 33. Contact slots 34 can also be seen each containing two contact elements such as 35 and 36. The return spring 9 for the carriage 8 is also shown, even though it belongs to the cover 7, as already mentioned. However, it could be constituted by a portion of a different component of the reader, and in particular of the contact frame 3.

FIG. 3 is a fragmentary section view through the contact frame on line A—A of FIG. 2. It can be seen therein that the carriage 8 comprises two portions 8A and 8B. The portion 8A is the portion that can be seen in FIG. 1a. This figure shows more clearly how the carriage fits on the carriage slideways 30 and 31. This portion 8A is fixed, e.g. by gluing, to the portion 8B which is the portion that can be seen in FIG. 2, with the portions being fixed together after the portion 8B has been inserted in the contact frame 3.

Before examining the contact elements such as 35, which are also visible in FIG. 3, reference is made initially to FIGS. 4 and 5 which are two sections through the contact frame on line B—B of FIG. 2, respectively showing the carriage in its rest position and in its actuated position. Both of these figures show the frame 3 and the two portions 8A and 8B of the carriage. They also show the end portions 23 and 21 of the carriage 8 sliding over the portions 27 and 25 of the frame 3.

Contact elements such as 35 and 36 are overmolded in the cross-members 40 and 41 of the frame 3. Each pair of aligned contact elements occupies one of the slots in the carriage 8, with the slot having two symmetrical flanks. FIGS. 4 and 5 show one of these flanks, with the section plane passing in front of the other flank. It can be seen that each connection element comprises a connection pin 50 folded towards the outside of the reader, and a cantilevered branch 51 extended in part by a rounded contact 52 and terminated by a guide portion 53. The portions 50, 52, and 53 can be seen in FIG. 3 where it can be seen that the guide portion 53 constitutes a T-shaped extension of the contact element whose side branches constitute shoulders 54 and 55 bearing against ramps 56 and 57 formed in the substance of the carriage 8. These ramps have a profile such that when the carriage is in the rest position as shown in FIGS. 1 to 4, the branches 54 and 55 bear against the "highest" portions 58 and 59 (in the direction of FIGS. 3 and 4) of the ramps 56 and 57, and the contact element 35 is in the situation shown, with the "lowest" portion (still in the direction of FIGS. 3 and 4) of the curved portion 52 lying flush with the surface 60 of the carriage 8. The same applies to contact elements 36. This surface 60, together with the surface 61 of the cover 7 serves to "vertically" delimit the path 62 along which a card is inserted into the reader.

It can also be seen that the contact elements 35 and 36 are held in the rest position by the ramps 56 and 57 of the carriage 8 while it is itself in the rest position, thereby remaining off the insertion path of a card. So long as the reader remains in this rest position, such insertion may take place beyond the contact portions 52 of the contact elements without the contact elements rubbing against the card. A card can thus be inserted freely until it bears against the wheel 33.

It can be seen in FIG. 4 that the wheel 33 which is freely housed in the hollow 32 of the carriage 8 is trapped therein since its housing is also delimited by a surface 63 of the frame 3 and by the surface 61 of the cover 7. Dimensions are such that the wheel is free to rotate easily. When a card 100 is inserted, as shown in FIG. 5, the end of the card engages the wheel 33 and thrusts against it, the wheel then acting as a drive member to transmit thrust to the portion 21 of the carriage 8. In a first stage, corresponding to engaging the surface 63 prior to the wheel 33 coming level with the housing 64, the wheel remains in position in front of the card. The card moves to the right, entraining the carriage 8. This movement takes place against the return force of the spring 9 (FIG. 2) represented by arrow RA. The ramps 56 and 57 move relative to the ends 53 of the contact elements. Beyond their "high" portions 58 and 59, the ramps 56 and 57 have "descending" portions 65. The contact elements 35 thus cease progressively to be supported by the ramps of the carriage 8. The contact elements are curved in such a manner as to be resiliently urged towards the card being inserted. They thus bear against the contact positions of the contact zone 66. From this moment, as the card continues to move forwards, friction is exerted between the card and the contact elements, thereby wiping the contacts clean. The end of this first stage is illustrated in FIG. 5. The wheel 33 reaches the housing 64. It is therefore retracted from in front of the card and held stationary in its housing, simultaneously holding the carriage 8 in place. This is the position shown in FIG. 5. Thereafter, and without further resistance, the card 100 moves under the wheel 33 until it stops by coming up against the portion 21 of the carriage 8, which thus acts as an abutment. The friction between the contact elements and the card continues up to this position.

Thereafter, when a card has been fully inserted, contact is established between each contact element and a corresponding contact position on the card, and the contact is established with a predetermined contact pressure corresponding to the bending prestress of the contact elements.

The card is not subjected to a return force tending to eject it since it is supported by the wheel 33 held stationary in its housing 64 from which it cannot escape because of the presence of the card. As a result the card is held in position while nevertheless being free to be withdrawn when a retraction force is applied thereto. The force required for extraction purposes is minimal since the only force to be overcome is the friction force between the wheel and the end of the card.

When the card moves back out from the reader, the return spring 9 returns the carriage with sufficient return force given the gently sloping ramps 56 and 57 to enable the contact elements to return to the situation illustrated in FIGS. 3 and 4.

Figure 6:
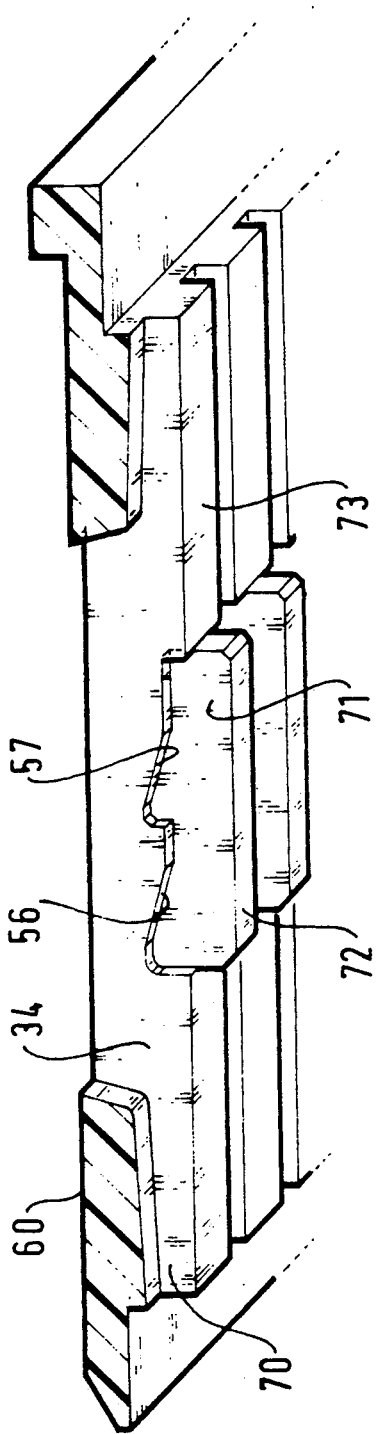
FIG. 6 is a perspective view in partial section of one of the slots of the portion 8B of the carriage as shown in the preceding figures.

FIG. 6 clarifies the structure of the portion 8B of the carriage 8. The items shown are described above and it can be seen that in the slot 34 of said part corresponding to each pair of contact elements, visible in the bottom surface 60 of the carriage, there extends a groove 70. In each flank of this groove a setback 71 defines the ramps 56 and 57 whereby the contact elements are actuated. The wall 72 of this setback projects beyond the top surface 73 of the groove 71 and forms cross-members which engage in the portion 8A and serve to reinforce it. Naturally, the two flanks of each slot and groove 34, 70 are symmetrical.

I claim:

1. In an IC card reader including card positioning and guide means, including a contact frame carrying contact elements which provide electrical contact with conducting areas of an IC card and via which circuits are established with the apparatus in which the IC card reader is incorporated, said card positioning and guide means including a fixed slot and fixed guideways for guiding said card along a fixed axis, said reader further including a moving carriage (8) mounted on said frame and moveable relative to the contact frame (3), having a rest position occupied by the carriage under the influence of return means (9) and in the absence of any card in the reader, and an actuated position into which said carriage is thrust by said IC card (100) inserted into the reader, said carriage (8) operatively engaging said contact elements such that when in said rest position, the carriage (8) causes the contact elements to be maintained in a rest position in which they are spaced from the insertion part (62) of said card, and when in the actuated position, the carriage (8) causes said contact elements to bear against the contact portions of the card, the improvement wherein said carriage (8) includes a ramp (56) engaging at least one shoulder (54, 55) of a respective one of said contact elements close to the end (53) of the contact element (35, 36) and said ramp (56) being formed in a flank of a slot in the carriage (8) in which a corresponding one of said contact elements is disposed, thereby overcoming carriage release of the contacts upon full insertion of the card in said card reader frame.

2. An IC card reader according to claim 1, wherein the contact elements are spring members, and said reader further comprises means operative by said card, said carriage (8) and the contact elements (35, 36) such that, when in the rest position, the carriage (8) flexes the spring members to raise the contact elements (35, 36) off the insertion path (62) of said card, and when in the actuated position, with a card (100) fully inserted in the reader, the carriage (8) releases the contact elements (35, 36) which flex against contact positions (66) of a contact zone of said card under a self-biasing return force of said spring members.

3. An IC card reader according to claim 2, wherein each contact element includes two shoulders (54 and 55) and the carriage includes two ramps (56) at each slot engagable with respective ones of said shoulders and disposed on either side of the longitudinal axis of each contact element (35, 36).

4. An IC card reader according to claim 3, wherein the two shoulders (54, 55) are defined by a T-shaped free end (53) of the contact element (35, 36).

5. An IC card reader according to claim 1, wherein the carriage (8) is slidably mounted in the contact frame (3) so as to be displaced from one of said positions to the other by sliding.

6. An IC card reader according to claim 5, wherein the carriage (8) is constituted by two separate portions (8A, 8B) to facilitate assembly of the contact frame and the carriage.

7. An IC card reader according to claim 5, wherein the contact frame (3) includes a resilient finger (9) engaging said carriage and serving as said carriage return means and disposed to urge the carriage (8) towards its rest position.

8. An IC card reader according to claim 1, wherein the carriage (8) includes a hollow (32) receiving a driving part (33), said driving part bearing on one side against a bearing surface of the contact frame (63) and projecting, on the other side, into the insertion path (62) of said card, such that said card (100), during insertion, encounters the driving part (33) shortly before reaching the end of the insertion stroke, thereby driving the carriage (8) via the driving part so as to move the carriage from its rest position to its actuated position.

9. An IC card reader according to claim 8, wherein said driving part (33) is circularly symmetrical, having its axis of symmetry extending substantially perpendicularly to the card insertion direction.

10. An IC card reader according to claim 9, characterized in that the driving part is a cylindrical wheel (33).

11. An IC card reader according to claim 8, characterized in that said bearing surface (63) includes a housing (64) corresponding to said actuated position and intended to receive a portion of the driving part (33), said portion being sufficient to enable the driving part to cease to project into the insertion path (62) of a card, whereby the card (100) as it continues its insertion stroke to a final position in which it encounters an abutment (21), maintains the driving part (33) in said housing (64) and consequently maintains the carriage (8) in its actuated position against the said return force applied to the carriage (8).

* * * * *